(12) United States Patent
Blount

(10) Patent No.: US 6,454,968 B1
(45) Date of Patent: Sep. 24, 2002

(54) FLAME RETARDANT POLYNITROGEN CONTAINING SALT OF BORON COMPOUNDS

(76) Inventor: David H. Blount, 6728 Del Cerro Blvd., San Diego, CA (US) 92120

( * ) Notice: Subject to any disclaimer, the term of this patent is extended or adjusted under 35 U.S.C. 154(b) by 0 days.

(21) Appl. No.: 09/692,382

(22) Filed: Oct. 20, 2000

Related U.S. Application Data

(62) Division of application No. 08/898,931, filed on Jul. 23, 1997, now Pat. No. 6,156,240.

(51) Int. Cl.[7] .......................... C09K 21/02; C09K 21/10
(52) U.S. Cl. ........................................ 252/601; 252/609
(58) Field of Search ................................. 252/601, 602, 252/607, 608, 609

(56) References Cited

U.S. PATENT DOCUMENTS

| | | | | |
|---|---|---|---|---|
| 3,629,055 A | * | 12/1971 | Riem et al. ................. | 252/601 |
| 5,418,282 A | * | 5/1995 | Wiehn ........................ | 524/735 |
| 5,580,661 A | * | 12/1996 | von Bonin et al. .......... | 428/427 |
| 5,837,621 A | * | 11/1998 | Kajander ..................... | 442/143 |
| 6,156,240 A | * | 12/2000 | Blount ........................ | 252/601 |
| 6,270,694 B1 | * | 8/2001 | Blount ........................ | 252/607 |

* cited by examiner

Primary Examiner—Jill Warden
Assistant Examiner—LaToya I. Cross

(57) ABSTRACT

Flammable organic material is made less flammable by incorporating a polynitrogen containing salt of polyboron oxyacid in or on the material. The polynitrogen containing salt of polyboron oxyacid is produced by reacting a boron oxyacid or salt of boron oxyadd with a nitrogen containing salt forming compound such as ammonia, amino compounds and amines in water. Both the polynitrogen radical and the boron oxyacid radical are both flame retardant agents. The polynitrogen salt of boron oxyacids may be used to form a flame retardant compositions by mixing it with carbonization auxiliaries and fillers. The polyammoniun alkali metal salts of polyboron oxyacids are useful as flame retardant agents and as a surfactant.

7 Claims, No Drawings

FLAME RETARDANT POLYNITROGEN CONTAINING SALT OF BORON COMPOUNDS

This application is a division of patent application Ser. No. 08/898,931, filed Jul. 23, 1997 now U.S. Pat. No. 6,156,240.

FIELD

The invention concerns novel polynitrogen containing salts of polyboron oxyacids compounds. The invention also concerns their preparation and use. The use can additionally concern flame retardants compounds and compositions in which said polynitrogen containing boron compounds are employed and their preparations.

BACKGROUND

Certain useful boron compounds are known such as boric acid, orthoboric acid, metaboric acid, tetraboric acid, borax ($Na_2B_4O_7$), kernite, calemonito, ammonium tetraborate ($NH_4HB_4O_7$), ammonium tetraborate ($(NH_4)_2B_4O_7$), zinc borate $(Zn)_2(B_2O_3)_3$ which is sold under the tradename "FIREBRAKE ZB" by U.S. Borax, Inc. These boron compounds must be used with other flame retardant compounds such as phosphorus compounds or halide compounds in order to produce a satisfactory flame retardant compound. Many U.S. Patent include boron acids and their derivities utilized with another flame retardant agent such as halogen containing compounds, nitrogen containing compounds, phosphorus containing compounds and sulfur containing compounds. It is well known in the Arts that the known salts of boron compounds alone are not a satisfactory flame retardant compound whereas the novel flame retardant polynitrogen containing salts of boron oxyacid compounds are good flame retardant compounds and may be used alone. The known basic salts of boron compounds form complex, large molecule compounds by the reaction of the boron atoms reacting with the oxygen atoms on other boron radicals. These complex salts of boron oxyacid do not beak down into acid compounds which produce char which protect the flammable material. This condensation process can be prevented by the process of this invention while producing novel flame retardant polynitrogen containing salts of boron oxyacids. These complex, large molecule salts of boron compounds such as ammonium borate ($NH_4HB_4O_7$) are broken down into smaller molecules by the molecules reacting with water in the present of a strong bases such as ammonium hydroxide and at the same time the ammonia reacts with the smaller molecule of salt of boron compounds to form polyammonium salt of polyboron oxyacid. This reaction also prevents the reformation of large complex molecules when the compounds are dried. On page 637 of General Chemistry by Mebergall-Schmidt-Holtzclaw, 4th addition published by D.C. Heath and Company, Lexington, Mass., illustrates that the borate salts form large molecules in units of $B_4O^{-2}$, such as ammonium borate, This formation of large molecules interfere with the flame retardant properties of the known boron salts. These large complex molecules of the salts of boron compounds when heated in a flame does not break down into sufficient acidic radical which produce charring of the burning flammable material. This charring is necessary to stop the flame by forming a char over the burned area. The flame retardant polynitrogen containing boron oxyacid compounds of this invention when heated by a flame breaks down into acidic radicals which produce charring and also the nitrogen containing radical also has flame retardant properties.

SUMMARY

In one aspect, the invention comprises polynitrogen containing salts of boron oxyacids.

Another aspect of the invention is a process to prepare polynitrogen containing salts of boron oxyacids comprising serially contacting A) boron oxide, dried boric acid and/or salts of boron compounds; 25 to 100 parts by weight;

B) nitrogen containing salt forming compounds; 25 to 100 parts by weight;

C) water, free or attached to molecules; 10 to 100 parts by weight; under conditions sufficient to prepare a polynitrogen containing salt of boron oxyacid compound. These polynitrogen containing salts of boron oxyacid compounds are useful flame retardant compounds and surfactant.

The flame retardant use comprises contacting an otherwise more flammable organic material with the polynitrogen containing salts of boron oxyacids thereof under conditions sufficient to lower the combustibility of the otherwise more flammable organic material, for example, an otherwise more combustible plastics, polyurethanes and natural products. Thus, a further aspect of the invention is a flame retardant composition comprising an otherwise more flammable organic material incorporated therewith a flame retardant amount of a polynitrogen containing salt of boron oxyacid.

Illustrature Embodiments

In general, the polynitrogen containing salt of boron oxyacids of this invention are produced utilizing boron oxide, dried boric acid and/or salts of boron oxyacids which are reacted with a strong basic compound in water such as concentrated aqueous ammonia. The large complex molecule salts of boron are broken down into smaller molecules by reacting water with one or more of the crosslinking oxygens which are then reacted with the strong basic compound to form a polynitrogen salt of boron oxyacids, such as polyammonium salt of boron oxyacids. The polynitrogen containing salts on the boron oxyacid molecules prevent the formation of large complex molecules. The ability of the polynitrogen containing salts of boron oxyacids of this invention to breakdown when heated into acidic radicals which produce a char on the flammable material along with a nitrogen containing flame retardant radical to stop the flames are improvements over the known salts of boron.

When one mol of boron oxide ($B_2O_3$) or dried boric acid are added to concentrated aqueous ammonia containing 2 or more mols of ammonia they react to produce a mixture of ammonium diborate ($NH_4$)$HB_2O_5$, diammonium diborate [$(NH_2)_2H_2B_2O_5$] and ammonium salt of boric acid ($NH_4BO_3$) but predominately diammonium diborate. When the mixture is dried two mols of ammonium salt of boric acid loss a mol of water and form more diammonium diborate.

When boric acid is added to an excess amount of concentrated aqueous ammonia they react to produce ammonium borate ($NH_4BO_3$) then upon drying two moles of the ammonium borate react to form diammonium diborate.

The polynitrogen containing salt of polyboron oxyacid compounds of this invention can be represented by the general formula of

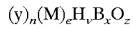

wherein y is a nitrogen containing salt forming radical, n is a number 2–4, M is a metal radical, e is a number 0–2, v is a number 0–3, x is a number 1–2 and z is a number 5–7.

The fire retardant polyammonium polyborate of this invention has the general formula of $$(NH_4)_n H_v B_x O_z$$

wherein n is a number 2–4, v is a number 0–3, x is a number 2–4 and z is a number 3–7.

Basic salts of boron oxyacids such as monoammonium pentaborate tetrahydrate produced by U.S Borax, Inc. is broken into smaller molecules by adding it to a concentrated aqueous solution of ammonia thereby producing a polyammonium salt of a polyboron oxyacid. When zinc borate [(ZnO)$_2$(B$_2$O$_3$)$_3$trihydrate] produce by U.S. Borax, Inc, is added to an excess of concentrated aqueous ammonia the zinc borate is split into smaller molecules by water then the ammonia reacts with the molecules to produce ammonium zinc borate and polyammonium zinc borate which are good flame retardant compounds. When amino borates such as melamine borate produced by Chemie Linz is added to an excess of concentrated aqueous ammonia the melamine borate is split into smaller molecules by the addition of water then the ammonia react with these molecules. Other alkaline metal borates such as borax and alkaline earth metal borates such as calemanito will react with concentrated aqueous ammonia to produce smaller molecules of ammonium alkali metal borate, polyammonium alkali metal borate, ammonium alkaline earth metal borates or polyammonium alkaline earth metal borates.

Any suitable boron compound may be used in this invention. Suitable boron compound include, but not limited to, boron oxide, dried boric acid which was heated to remove water, boron oxyacids such as orthoboric acid, metaboric acid and tetraboric acid, metal borates, alkali metal borates, alkaline earth metal borates, ammonium borates, amine borates, polyamine borates, amino borates such as urea borates, melamine borates, etc., polyamide borates and mixtures thereof. Boron oxide is the preferred boron compound.

Any suitable nitrogen containing salt forming compound may be used in this invention. Suitable nitrogen containing compounds include, but not limited to, ammonium hydroxide, amino compounds, amines, polyamines, amides, polyamides, aminoplasts, ammonium carbonate, alkyl carbamates, sulfamic acids, ammonium sulfamate, thioureas, quaternary ammonium salts, alkylanolamines, nitriles, alkyl isocyanates, organic ammonium salts, etc., and mixtures thereof. Suitable amino compounds include, but not limited to, urea, alkyl urea, buiret, amino condensation compounds, ammonium polyaminocarbamate, melamine, melamine cyanurate, dicyandiamide, guanidine, cyanoguanidine, ammeline, aminoguanidine and mixtures thereof. Ammonium hydroxide is the preferred nitrogen containing compound.

The novel flame retardant polynitrogen containing salt of polyboron oxyacid of this invention is a very good flame retardant compound and insecticide when used alone but may also be use with other flame retardant compounds, fillers and carbonization auxiliaries in a flame retardant composition. Any suitable carbonization auxiliaries that in the presence of fire assist the formation of a carbonization foam and/or char, such as, additives that produce acidic components in the pyrolysis mixture, such as phosphorus acids, boric acids or sulfuric acids. These acidic components are compounds such, for example, acids or salts or their derivatives of sulfur, boron and phosphorus, such as, boronphosphate, phosphates, and polyphosphates of ammonia, amines, polyamines, amino compounds, thiourea, and alkylamolamines, but boric acid and its salts and their derivatives, organic phosphorus compounds and their salts, halogenated organic phosphorus compounds, their salts and their derivatives may also be used for this purpose. The carbonization auxiliaries and other flame retardant agents may be used in quantities of 0 to 300 percent by weight of the polynitrogen containing salt of polyboron oxyacid. The nitrogen salts of phosphorus acids are the preferred carbonization compound such as the amino phosphates.

Any suitable filler may be used in this invention. The fillers that may be utilized in the flame retardant mixture are usually insoluble in the reaction mixture. They may be inorganic substances, such as, alkali metal silicates, alkaline earth metal silicates, metal silicates, silica, metals, metal oxides, carbonates, sulphates, phosphates and borates, glass beads or hollow beads. Hydrated aluminum oxide is the preferred inorganic filler. The fillers may be organic substances, such as amino compounds, such as, urea, melamine, dicyandiamide and other cyanuric derivatives or their formaldehyde resins, aminophosphates, amino salts of organic phosphates, phenolaldehyde resin powder, powdered coke, graphite compounds and mixtures thereof. The organic halide flame retardant compounds may also be used as fillers. Fillers may be used in the amount of 0 to 300 parts by weight based on the weight of the polynitrogen containing salt of boron oxyacid.

Any suitable organic material which is more flammable than the polynitrogen containing salt of boron oxyacid may be used in this invention. Any suitable plastic resin composition or mixtures thereof and any suitable natural organic material may be used in this invention and mixtures thereof. These materials may be in the form of a solid, cellular suspension, emulsion or solution. Suitable plastic resin include, but not limited to, vinyl dienes, vinyl-diene copolymers, polyesters, polyester resins, phenoplasts, aminoplasts, polyepoxy resins, polyurethanes, furans, polyamides, polycarbonates, homopolymers of such olefins as ethylene, propylene, and butylene; block copolymers, consisting of optional combination of these olefins; polymers of vinyl compounds such as vinyl chloride, acrylonitrile, methyl acrylates, vinly acetates and styrenes; copolymers of the foregoing olefins with vinyl monomers, copolymers and terpolymers of the foregoing olefins, with diene compounds; polyesters such as polyethlylene terephthalate, polyester resins; polyamides such as nylon; polycarbonates, polyoxymethylene, silicones, polyethers, thioplasts, polytetrafluoroethylene, polysufones, vinyldienes, poly(vinyl acetete), aliphatic allyl compounds, polyacrylonitrile, aliphatic dienes, polybutadiene, butadiene-acrylonitrile, butadiene-styrene copolymers, aromatic vinyl compounds, heterocyclic vinyl compounds, cyclic unsaturated compounds, polyurethanes, urethane-epoxy resins, polyimides, urethane silicates, cellulose nitrate rayon, regenerated cellulose film cellulose acetate, cellulose esters, cellulose ethers, cyanoethyl cellulose, chlorinated rubber and mixtures thereof.

Suitable natural products include, but not limited to, wood, cellulose, lignin-cellulose, paper, cotton, wool, linen, dammars, copols, other natural resins, rosins, lignin, natural rubber, natural proteins, e.g., soya bean protein, silk, glues, gelatin, etc.; modified cellulose and mixtures thereof. Natural organic and plastics may be mixed together.

The preferred method to produce the polynitrigen containing salt of polyboron oxyacids is to add the boron oxide, dried boric acid, boric acid or salts of boron oxyacids to an aqueous solution, emulsion or suspension of ammonia, amine, polyamine, amino compounds, etc. at ambient temperature and pressure. In some reactions it is necessary to cool the mixture or heat the mixture, When ammonia is used it is necessary to increase the pressure or cool the mixture. When amino compounds are used it is preferred to react the amino compounds with the boron oxyacid then add an excess amount of aqueous ammonia to react with the remaining boron oxyacid radicals thereby producing a polyammonium amino salt of boron oxyacid. The preferred method to produce polyammonium salt of polyboron oxyacid is to slowly add the boron oxide or boron oxyacid to an excess concentrated aqueous ammonia while agitating and keeping the mixture below the temperature that ammonia boil out of the water, the reaction is complete in 1 to 6 hours. The mixture is then dried and pulverized into a powder.

The powdered polynitrogen containing salt of polyboron oxyacids or polynitrogen salt of boron oxyacid may be added to the plastic when it is in the form of a liquid, emulsion, suspension or mixed in melted plastics. It may be added to the monomer components before producing the plastics. This flame retardant compound may also be applied to the exterior surface of the solid or cellular plastic or natural products. The powdered polynitrogen containing salt of boron oxyacids or polynitrogen salt of polyboron oxyacid may be used in an amount of 1%–100% by weight based on the weight of the more flammable organic material.

The more flammable organic material with the flame retardant polynitrogen containing salt of polyboron acids, polynitrogen containing metal salt of polyboron oxyacids and/or polynitrogen containing salt of boron oxyacid incorporated in the material were tested using a 2" propane flame applied to the material for 1 minute, The flame did not spread and went out when the propane flame was removed. The flammable organic material tested burned without the flame retardant being present. On tested samples of these flame retarded materials using the oxygen index test the oxygen index was raised 10 to 30 percent.

DESCRIPTION OF PREFERRED EMBODIMENTS

This invention will be illustrated in greater detail in the specific examples which follow, which detail the preferred embodiment of my process. It should be understood that the scope of my invention is not limited to the specific processes set out in the examples. Parts and percentages are by weight unless otherwise indicated.

EXAMPLE 1

100 gms of boric acid (orthoboric acid) are heated to 100° C. to 120° C. to dehydrate about 1 mol of water per molecule of the boric acid thereby producing metaboric acid ($HBO_2$) then it is slowly added to 100 gms of aqueous ammonia, containing 25% ammonia, at ambient temperature and pressure. The mixture is cooled to keep the temperature to below the boiling point wherein the ammonia escapes from the water. The mixture is allowed to react for 1–4 hours thereby producing ammonia salt of metaboric acid ($NH_4$)$BO_3$ then the excess water is evaporated off by heating or spray drying thereby producing a powdered polyammonium diborate with the general formula

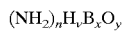

$(NH_2)_n H_v B_x O_y$ wherein n is a number 2–4, v is a number 0–3, x is a number 2–4 and y is a number 5–7.

EXAMPLE 2

100 gms of boric acid are heated to 140° to 160° C. until two mols of water per molecule are removed thereby producing tetraboric acid ($H_2B_4O_7$) then it is added slowly to 100 gms of aqueous ammonia containing 25% ammonia while agitating. The mixture is allowed to react for 12 hours thereby reducing the tetraboron oxyacid to diboron oxyacid and boric acid, and reacting it with the ammonia thereby producing ammonia salt of boric acid and polyammonium salt of polyboron oxyacid. The mixture is then dried by heat or spray drying and two mols of the ammonia salt of boric acid react to produce a powdered polyammonium diborate $(NH_2)_2H_2B_2O_3$).

EXAMPLE 3

100 gms of boric acid are heated to 160° C. to 200° C. until three mols of water is removed per molecule thereby producing boron oxide ($B_2O_3$). The powdered boric oxide is slowly added to 100 gms of aqueous ammonia containing 25% ammonia while agitating and keeping the temperature below the temperature wherein the ammonia evaporates from the water. Increase pressure may also be used to prevent the loss of ammonia from the water and the ammonia may be added to the water in a gaseous form, The mixture is allowed to react for 1–4 hours thereby producing a mixture of monoammonium diborate, diammonium dibromate, polyammonium dibromate and ammonium salt of boric acid. The mixture is dried and the ammonium salt of boric acid condensates to form diammonium diborate. The mixture is pulverized into a fine powder.

EXAMPLE 4

100 parts by weight of powdered ammonium borate ($NH_4H$ $B_4O_7 \cdot 3H_2O$) are added to 100 parts by weight of concentrated aqueous ammonia containing 25% ammonia while agitating and the mixture is allowed to react for about 4 hours. The ammonium borate is hydrolyzed and split into smaller molecules then the ammonium radicals react with the ammonium borate to produce polyammonium salt of polyboron oxyacid. It is dried and pulverized into a powder with the general formula of

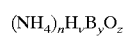

$(NH_4)_n H_v B_y O_z$ wherein n is a number 2–4, v is a number 0–3, y is a number 2–4 and z is a number 5–7.

EXAMPLE 5

About 100 parts by weight of powdered borax ($Na_2B_4O_7 \cdot 4H_2O$) are added to 100 parts by weight of concentrated aqueous ammonia containing 25% ammonia while agitating. The mixture is reacted for about 4 hours at ambient temperature and pressure thereby hydrolyzing the sodium borate and splitting the molecules into smaller molecules. The ammonia reacts with the sodium borate to produce an ammonium sodium salt of polyboron oxyacid and polyammonium sodium borate which is dried and pulverized into a powder with the general formula

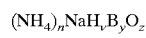

$(NH_4)_n NaH_v B_y O_z$ wherein n is a number 1–3, v is a number 0–3, y is a number 2–4 and z is a number 5–7.

EXAMPLE 6

About 100 parts by weight of powdered calcium borate ($Ca_2B_6O_{11}$) are added to 100 parts by weight of concentrated aqueous ammonia containing 25% ammonia while agitating. The mixture is reacted for 8 hours at ambient temperature and pressure. The calcium borate is hydrolyzed and split into smaller molecules then the ammonia react with the molecules thereby producing ammonium calcium salt of polyboron oxyacid and polyammonium calcium salt of polyboron oxyacid. It is then dried and pulverized into a powder.

EXAMPLE 7

About 100 parts by weight of powdered zinc borate [$(ZnO)_2(B_2O_3).3H_2O$], produced by U.S. Borax, Inc., are added to about 100 parts by weight of concentrated ammonia containing 25% ammonia while agitating. The mixture is allowed to react for 12 hours and the zinc borate is hydrolyzed, split into smaller molecules and reacted with ammonia radicals thereby producing ammonium zinc salts of polyboron oxyacid and polyammonium zinc salt of polyboron oxyacid. It is then dried and pulverized into a fine powder.

EXAMPLE 8

About 100 parts by weight of a commercial melamine borate powder are added to about 100 parts by weight of concentrated aqueous ammonia containing about 25% ammonia while agitating. The mixture is reacted for 12 hours at ambient temperature and pressure. The melamine borate is hydrolyzed into smaller molecules and the ammonia radical reacts with the oxyacid boron radicals thereby producing an ammonium melamine salt of polyboron oxyacid and polyammonium melamine salt of polyboron oxyacid. It is then dried and pulverized into a fine powder.

EXAMPLE 9

80 gms of powdered urea are mixed with 80 gms of water the 80 gms of boron oxide powder is slowly added while agitating for 2 hours thereby producing urea salt of diboron oxyacid, diurea salt of diboron oxyacid and urea salt of boric oxyacid which is dried and pulverized.

EXAMPLE 10

Example 9 is modified wherein another amino compound is used in place of urea and selected from the list below:

| | |
|---|---|
| a) melamine | g) guanidine carbonate |
| b) methyl urea | h) urea-formaldehyde resin |
| c) dicyandiamide | i) melamine cyanurate |
| d) buiret | j) ammeline |
| e) guanidine | k) mixture thereof |
| f) aminoguanidine | |

EXAMPLE 11

Example 9 and 10 are modifies wherein about 100 parts by weight of the amino salt of diboron oxyacid produced in example 9 and 10 are each added to different containers of 100 parts by weight of aqueous ammonia containing about 25% ammonia and reacted for 4 hours under ambient temperature and pressure. The ammonia radicals react with the amino salt of diboron oxyacid thereby producing ammonium amino diboron oxyacid and polyammonium amino polyboron oxyacid. It is then dried and pulverized into a powder.

EXAMPLE 12

60 parts by weight of powdered boron oxide are slowly added to 60 parts by weight of water containing 30 parts by weight of methylamine while agitating and keeping the temperature below the boiling point of methyl amine. The mixture is reacted for 2–4 hours thereby producing a mixture of methylamine salt of boron oxyacid, methylamine salt of diboron oxyacid and polymethylamine salt of polyboron oxyacid. The mixture is then dried and the methyl amine boric acid condensates to form dimethylamine salt of diboron oxyacid which is then pulverized into a powder.

EXAMPLE 13

Example 12 is modified wherein another amine compound is used in place of methylamine thereby producing a polyamine salt of polyboron oxyacid. The amine compound is selected from the list below:

| | |
|---|---|
| a) propylamine | j) polyamine (ANCAMINE by Air Products, Inc.) |
| b) butylamine | k) diethylenetriamine |
| c) proplylenediamine | l) ethanolamine |
| d) ethylamine | |
| e) diethylamine | |
| f) dipropylamine | |
| g) triethylamine | |
| h) triethylenediamine | |
| i) aniline | |

EXAMPLE 14

Examples 12 amd 13 are modified wherein the polyamine salt of polyboron oxyacids of example 12 and 13 are reacted with ammonia by adding 100 parts by weight of each to 100 parts by weight of different containers of concentrated aqueous ammonia containing 25% ammonia. The mixture is agitated and reacted for 2–4 hours thereby producing polyammonium amine salts of polyboron oxyacid which is then dried and pulverized into a powder.

EXAMPLE 15

Example 12 is modified wherein an amide or polyamide with free $NH_2$ radical is used in place of methylamine there by producing a polyamide salt of polyboron oxyacid and selected from the list below:
a) acetamide
b) propionamide
c) versamid resin
d) diethyldiamine phthalate
e) ethylenediamine salt of linoleic acid.

EXAMPLE 16

About 25 parts by weight of the powdered polyammonium salt of polyboron oxyacid of example 1 are mixed with 75 parts by weight of an unsaturated polyester resin (POLYLITE BY REICHHOLD) then a catalytic amount of methyl ethyl ketone peroxide (MEKP) are added and mixed in the resin. The resin gels in about 30 minutes and becomes hard in about 1 hour.

After curing for 1 week the solid flame retardant polyester resin is flame tested by placing a ⅛"×2"×6" strip vertically in a holder then placing a 2" propane flame against the bottom of the test strip for one minute. The flame did not spread and when the flame was removed the flame went out in 1–3 seconds. There was no after glow and there was less smoke produced.

EXAMPLE 17

Example 16 was modified wherein another polynitrogen containing salt of polyboron oxyacid, giving the same flame testing results as in example 16, was used in place of the polyammonium salt of polyboron oxyacid of example 1 and selected from the list below:
a) polyammonium salt of polyboron oxyacid of example 2
b) polyammonium salt of polyboron oxyacid of example 3
c) polyammonium salt of polyboron oxyacid of example 4
d) polyammonium sodium salt of polyboron oxyacid of example 5
e) polyammonium calcium salt of polyboron oxyacid of example 6
f) polyammonium zinc salt of polyboron oxyacid of example 7
g) polyammonium melamine salt of polyboron oxyacid of example 8
h) urea salt of polyboron oxyacid of example 9
i) polyammonium urea salt of polyboron oxyacid of example 11
j) polyamine salt of polyboron oxyacid of example 13 h
k) polyammonium methylamine salt of polyboron oxyacid of example 10
l) polyamide salt of polyboron oxyacid of example 15 d
m) mixtures of the above polynitrogen containing salts of polyboron oxyacids.

EXAMPLE 18

About 25 parts by weight of the polyammonium salt of polyboron oxyacid of example 1 are added and mixed in 60 parts by weight of epoxy resin (EPON (R) 829 BY SHELL) and 20 parts by weight of a polyamine (ANCAMINE BY AIR PRODUCTS). The mixture hardens in 1–4 hours thereby producing a solid flame retardant polyepoxy resin. The resin is cured for 1 week then flame tested by using a 1/8"×2"×6" test sample which is place vertically in a holder then a 2" propane flame is placed at the bottom of the test sample for 1 minute. The flames did not spread and went out when the propane flame was removed. There was no afterglow and there was less smoke produced.

EXAMPLE 19

Example 18 is modified wherein another polynitrogen containing salt of polyboron oxyacid is used and gives the same flame testing result as in example 18. The polynitrogen containing salt of polyboron oxyacid used in place of the polyammonium salt of polyboron oxyacid of example 1 is selected from the list below:
a) polyammonium salt of polyboron oxyacid of example 2
b) polyammonium salt of polyboron oxyacid of example 3
c) polyammonium salt of polyboron oxyacid of example 4
d) polyammonium zinc salt of polyboron oxyacid of example 7
e) polyammonium melamine salt of polyboron oxyacid of example 8
f) urea salt of diboron oxyacid of example 9
g) polyammonium urea salt of polyboron oxyacid of example 11
h) polyammonium melamine salt of polyboron oxyacid of example 11
i) diethylenetriamine salt of polyboron oxyacid of example 13 k
j) polyammonium diethylenediamine salt of polyboron oxyacid of example 14
k) diethyldiamine phthalate salt of polyboron oxyacid of example 15 d
l) and mixtures of the above.

EXAMPLE 20

Example 19 is modified wherein another commercial epoxy resin and polyamine catalyst is use in place of EPON the polyepoxy resin and ANACAMINE the polyamine curing agent thereby obtaining the same flame test results.

EXAMPLE 21

Example 16 is modified wherein a unsaturated polymerizable monomer along with its catalyst is utilized in place of the unsaturated polyester resin of example 16 which gives the same flame test results and selected from the list below:

| | |
|---|---|
| a) styrene | k) vinyl pyrrolidone |
| b) vinyl acetate | l) vinyl chloride |
| c) acrylic acid | m) vinyl toluene |
| d) methacrylic acid | |
| e) methyl methacrylate | |
| f) acrylonitrile | |
| g) chloroprene | |
| h) vinyl methyl ether | |
| i) vinylidene chloride | |
| j) vinyl isobutyl ether | |

EXAMPLE 22

About 25 parts by weight of polyammonium salt of polyboron oxyacid produced in example 1 is mixed with 75 parts by weight of melted polyvinyl acetate then poured into a 1/8"×2"×6" mold, The flame retarded polyvinyl acetate sample is cooled then flame tested. The sample is hung vertically in a holder then a 2" propane flame is placed at the bottom of the test sample for 30 seconds. The sample melts but does not catch on fire. The melted portion of the sample is further tested by placing the flame on the melted portion for another 30 seconds. The melted portion did not catch on fire.

EXAMPLE 23

Example 22 is modified wherein another polynitrogen salt of polyboron oxyacid is used in place of the polyammonium salt of polyboron oxyacid produced in example 1 and produced the same results in the flame test. The polynitrogen salt of polyboron oxyacid is selected from the list below:
a) polyammonium salt of polyboron oxyacid produced in example 2
b) polyammonium salt of polyboron oxyacid produced in example 3
c) polyammonium salt of polyboron oxyacid produced in example 4
d) polyammonium zinc salt of polyboron oxyacid produced in example 7
e) polyammonium melamine salt of polyboron oxyacid produced in example 8 urea salt of polyboron oxyacid produced in example 9
g) polyammonium urea salt of polyboron oxyacid produced in example 11
h) polyammonium methylamine salt of boron oxyacid produced in example 14

EXAMPLE 24

Examples 22 and 23 are modified wherein 10 parts by weight of the polynitrogen containing salt of polyboron oxyacid is added per 90 parts by weight of the polyvinyl acetate.

EXAMPLE 25

Example 22 is modified wherein another meltable plastic is used in place of vinyl acetate and giving the same flame testing results. The meltable plastic is selected from the list below:

a) polystyrene
b) nylon
c) polyester
d) solid polyester polyol
e) polyethylene
f) polypropylene
g) polyamide

EXAMPLE 26

15 parts by weight of polyammonium salt of polyboron oxyacid is added and mixed in with an aqueous emulsion containing 50% vinyl acetate then poured into a mold ¼"×2"×6" and then dried. After it is completely dried the sample is placed vertically in a hanger then a 2" propane flame is placed against the bottom of the sample for 30 seconds the sample melted but did not catch on fire, The melted portion of the sample was further tested by placing the flame on the melted portion for 30 second and the material did not catch on fire.

EXAMPLE 27

Example 26 is modified wherein another polynitrogen containing salt of polyboron oxyacid is used in place of the polyammonium salt of polyboron oxyacid produced in example 1 with the same flame testing results. The polynitrogen containing salt of polyboron oxyacid is selected from the list below:
a) polyammonium salt of polyboron oxyacid produced in example 2
b) polyammonium salt of polyboron oxyacid produced in example 3
c) polyammonium salt of polyboron oxyacid produced in example 4
d) polyammonium zinc salt of polyboron oxyacid produced in example 7
e) polyammonium melamine salt of polyboron oxyacid produced in example 8 urea salt of polyboron oxyacid produced in example 9
g) polyammonium urea salt of polyboron oxyacid produced in example 11
h) polyammonium methylamine salt of boron oxyacid produced in example 14
i) mixtures of the above

EXAMPLE 28

Example 26 is modified wherein another aqueous emulsion of a plastic is used in place of vinyl acetate and obtaining the same flame test results. The aqueous emulsion containing 50% by weight of a plastic selected from the list below:

| | | | |
|---|---|---|---|
| a) | vinyl acetate-ethylene copolymer (AIRFLEX RP-226 BY AIR PRODUCTS) | j) | polystyrene |
| | | k) | methyl methacrylate |
| | | l) | phenol-formaldehyde resin |
| b) | polyester resin | m) | polybutadiene-styrene copolymer |
| c) | polyepoxy resin | | |
| d) | polyurethane | | |
| e) | polyurethane-epoxy | | |
| f) | polyvinyl chloride | | |
| g) | polyvinyl acetate-polyvinyl chloride copolymer | | |
| h) | acrylic latex paint | | |
| i) | acrylic enamel paint | | |
| J) | rubber latex | | |

EXAMPLE 29

50 parts by weight of polyammonium salt of polyboron oxyacid produced in example 1 are added to and mixed with 100 parts by weight of a polyol for flexible foams (DALTOFLEX XS 1870 BY ICI) then mixed with 60 parts by weight of polyisocyanate (SUPASEC X2424 BY ICI). The mixture foam then solidifies into a flexible foam of about 1.5 lbs/cu.ft. The foam is cured for 1 week then flame tested. A ½"×2"×6" sample of the foam is fixed vertically on a holder the a 2" propane flame is placed under the bottom edge for 1 minute. The flames did not spread and the flame went out within 5 seconds after the propane flame was removed and there was no afterglow, There was a decrease in the amount of smoke produced.

EXAMPLE 30

Example 29 is modified wherein another polyisocyanate is used in place of the polyol (SUPASEC by ICI) and selected from the list below:
a) TDI 180 by OLIN
b) polymeric MDI (MONDUR MR by MOBAY)
c) methylene diphenyl isocyanate
d) modified polyisocyanate (MONDUR T-422 BY MOBAY)

EXAMPLE 31

Example 29 is modified wherein another polynitrogen containing salt of polyboron oxyacid is used in place of polyammonium salt of polyboron oxyacid produced in example 1 and selected from the list below:
a) polyammonium salt of polyboron oxyacid produced in example 2
b) polyammonium salt of polyboron oxyacid produced in example 3
c) polyammonium salt of polyboron oxyacid produced in example 4
d) polyammonium zinc salt of polyboron oxyacid produced in example 7
e) polyammonium melamine salt of polyboron oxyacid produced in example 8
f) urea salt of polyboron oxyacid produced in example 9
g) polyammonium urea salt of polyboron oxyacid produced in example 11
h) polyammonium methylamine salt of boron oxyacid produced in example 14
i) mixtures of the above.

EXAMPLE 32

50 parts by weight of polyammonium salt of polyboron oxyacid produced in example 1, 100 parts by weight of sorbitol based polyol, hydroxyl No. 490, 5 parts by weight of water as the blowing agent, 1 part by weight of foam regulator (DOW 193), 0.25 part by weight of tin octoate and 2 parts by weight of a urethane amine catalyst (DABCO R8020 by AIR PRODUCTS) are mixed. The mixture is mixed with 120 parts by weight of polymeric MDI (MONDUR MR by MILES) then poured into a mold. The mixture expands to form a 2 lbs./cu.ft. rigid foam. After 1 week the foam is flame tested by obtaining a ½"×2"×6" sample of this foam and hanging it vertically on a holder then a 2" propane flame is placed at the bottom of the sample for 1 minute. The flame did not spread and the flame went out when the propane flame was removed. There was no after glow and there was less smoke generated.

EXAMPLE 33

Example 32 is modified wherein another polynitrogen containing salt of boron oxyacid is used in place of the polyammonium salt of polyboron oxyacid produced in example 1 and is selected from the list below:
a) polyammonium salt of polyboron oxyacid produced in example 2
b) polyammonium salt of polyboron oxyacid produced in example 3
c) polyammonium salt of polyboron oxyacid produced in example 4
d) polyammonium zinc salt of polyboron oxyacid produced in example 7
e) polyammonium melamine salt of polyboron oxyacid produced in example 8
f) urea salt of polyboron oxyacid produced in example 9
g) polyammonium urea salt of polyboron oxyacid produced in example 11
h) polyammonium methylamine salt of polyboron oxyacid produced in example 14
i) mixtures of the above.

EXAMPLE 34

20 parts by weight of polyammonium salt of polyboron oxyacid produced in example 1 are added to 20 parts by weight of polyol with catalyst (polyol component for solid polyurethanes by 3M) then rapidly mixed with 60 parts by weight of polyisocyanate component (polyisocyanate prepolymer for solid polyurethane by 3M) then poured into a 1/8"×2"×6" mold. The solid polyurethane is then vertically placed into a holder and flame tested by placing a 2" propane at the bottom of the test sample for 1 minute. The flame did not spread and went out after the propane flame was removed. There was no afterglow and there was a reduction in the amount of smoke.

EXAMPLE 35

Example 34 is modified wherein another polynitrogen containing salt of polyboron oxyacid is use in place of the polyammonium salt of polyboron oxyacid produced in example 1 and selected from the list below:
a) polyammonium salt of polyboron oxyacid produced in example 2
b) polyammonium salt of polyboron oxyacid produced in example 3
c) polyammonium salt of polyboron oxyacid produced in example 4
d) polyammonium zinc salt of polyboron oxyacid produced in example 7
e) polyammonium melamine salt of polyboron oxyacid produced in example 8 urea salt of polyboron oxyacid produced in example 9
g) polyammonium urea salt of polyboron oxyacid produced in example 11
h) polyammonium methylamine salt of polyboron oxyacid produced in example 14
i) mixtures of the above.

EXAMPLE 36

Examples 16, 19, 22 and 29 are modified where 20 parts by weight of a carbonization auxiliary is added with the polynitrogen salt of polyboron oxyacid and selected from the list below:
a) melamine phosphate
b) boric acid
c) boron oxide
d) boron phosphate
e) melamine boron phosphate
f) dimethy methyl phosphonate
g) ammonium pyrophosphate
h) mixtures of the above.

EXAMPLE 37

Examples 16, 19, 22 and 29 are modified wherein 20 parts by weight of a filler is added to the polyol and selected from the list below:
a) melamine
b) urea
c) dicyandiamide
d) powdered coke
e) aluminum hydroxide
f) sodium silicate
g) magnesium hydroxide
h) ammonium molybdate
l) zinc stannate
j) dimethy methyl phosphonate salt of melamine
k) mixtures of the above.

EXAMPLE 38

Flame testing studies were done using known salts of boron and the polynitrogen containing salts of polyboron oxyacids of this invention The test was passed if it did not burn after the flame was removed. The samples were made by adding and mixing 20 parts by weight of the boron salts selected from the list below to 80 parts by weight of an unsaturated polyester resin (POLYLITE BY REICHHOLD) then adding a catalytic amount of methyl ethyl Ketone peroxide. The resin is cured in 1/8"×2"×6" samples then placed vertically on a stand. A 2" propane flame is placed at the bottom of the sample for 1 minute with the following results:

| | Salts of boron oxyacid | Test results |
| --- | --- | --- |
| a) | polyammonium salt of polyboron oxyacid produced in example 2 | passed |
| b) | polyammonium salt of polyboron oxyacid produced in example 3 | passed |
| c) | polyammonium salt of polyboron oxyacid produced in example 4 | passed |
| d) | polyammonium zinc salt of polyboron oxyacid produced in example 7 | passed |
| e) | polyammonium melamine salt of polyboron oxyacid produced in example 8 | passed |
| f) | urea salt of polyboron oxyacid produced in example 9 | passed |
| g) | polyammonium urea salt of polyboron oxyacid produced in example 11 | passed |
| h) | polyammonium methylamine salt of polyboron oxyacid produced in example 14 | passed |
| i) | boric acid | not cured |
| j) | borax | burned |
| k) | melamine borate | burned |
| l) | ammonium pentaborate | burned |
| m) | zinc borate | burned |
| n) | melamine borate | burned |
| o) | ammonium tetraborate tetrahydrate | burned |
| p) | boron oxide | not cured |
| q) | calcium borate | burned |

I claim:
1. The process for reducing combustibility of an otherwise more flammable organic material comprising incorporating a solid polynitrogen containing salt of polyboron oxyacid with the otherwise more flammable material under reacting conditions and in an amount sufficient to reduce the combustibility of the otherwise more flammable organic material, said solid polynitrogen containing salt of polyboron oxyacid is produced by the process consisting of mixing at ambient temperature, heating, up to the boiling point of the nitrogen containing salt forming compound for 1 to 6 hours and reacting the following components:

A) boron compound selected from the group consisting of boron oxide, dried boric acid, boric acid and/or salts of boron oxyacids, in the amount of 25 to 100 parts by weight;

B) nitrogen containing salt forming compound selected from the group consisting of ammonia, ammonium hydroxide, ammonium carbonate, ammonium salt of organic compounds, amino compounds, amines, polyamines, amides, polyamides and mixtures thereof; in an amount of 25 to 100 parts by weight;

C) water; 10 to 100 parts by weight; the polynitrogen containing salt of polyboron oxyacid is heated till dry then pulverized into a powder.

2. The process of claim 1 wherein the polynitrogen containing salt of polyboron oxyacid corresponding to the general formula $$(Y)_n(M)_e H_v B_x O_z$$

wherein Y is a nitrogen containing salt forming radical, n is a number 2–4, M is a metal radical, e is a number 0–2, v is a number 0–3, x is a number 2–4, and z is a number 5–7.

3. The process of claim 1 wherein component A is ammonium borate and component B is concentrated aqueous ammonia thereby producing a solid polyammonium salt of polyboron oxyacid.

4. The process of claim 1 wherein component A is zinc borate and Component B is concentrated aqueous ammonia thereby producing a solid polynitrogen zinc salt of polyboron oxyacid.

5. The process of claim 1 wherein Component A is boron oxide and component B is concentrated aqueous ammonia and when the reaction is complete it is dried into a powder thereby producing a polyammonium salt of polyboron oxyacid with the general formula $$(NH_4)_n H_v B_2 O_5$$

wherein n is a number 2–4 and v is a number 0–2.

6. The process of claim 2 wherein the metal radical is selected from the group consisting of zinc, magnesium, aluminum, molybdate, calcium, antimony and mixtures thereof.

7. A flame retardant polynitrogen containing salt of polyboron oxyacid composition containing the following components:

A) polynitrogen containing salt of polyboron oxyacid produced by the process of claim 1, B) Carbonization auxiliaries;

C) fillers.

* * * * *